United States Patent
Kobayashi et al.

(10) Patent No.: US 12,240,400 B2
(45) Date of Patent: Mar. 4, 2025

(54) SIDE AIRBAG DEVICE

(71) Applicant: Autoliv Development AB, Vargarda (SE)

(72) Inventors: Yuto Kobayashi, Kanagawa (JP); Hiroyuki Shima, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 17/904,353

(22) PCT Filed: Jan. 20, 2021

(86) PCT No.: PCT/JP2021/001846
§ 371 (c)(1),
(2) Date: Aug. 16, 2022

(87) PCT Pub. No.: WO2021/166530
PCT Pub. Date: Aug. 26, 2021

(65) Prior Publication Data
US 2023/0071361 A1  Mar. 9, 2023

(30) Foreign Application Priority Data

Feb. 21, 2020 (JP) ................................. 2020-027753

(51) Int. Cl.
*B60R 21/207* (2006.01)
*B60R 21/231* (2011.01)
(Continued)

(52) U.S. Cl.
CPC ...... *B60R 21/207* (2013.01); *B60R 21/23138* (2013.01); *B60R 21/2338* (2013.01);
(Continued)

(58) Field of Classification Search
CPC ............ B60R 21/207; B60R 21/23138; B60R 21/2338; B60R 2021/23146; B60R 2021/23324
See application file for complete search history.

(56) References Cited

U.S. PATENT DOCUMENTS 8,157,291 B2 * 4/2012 Mayer ................... B60R 21/276
280/743.2
9,296,356 B2 * 3/2016 Fujiwara ............... B60R 21/233
(Continued)

FOREIGN PATENT DOCUMENTS

CN       109153362 A    1/2019
DE   202006014012 U1    1/2008
(Continued)

OTHER PUBLICATIONS

WO-2017209192-A1 Machine English Translation (Year: 2017).*
(Continued)

*Primary Examiner* — Jason D Shanske
*Assistant Examiner* — Matthew James O'Neill
(74) *Attorney, Agent, or Firm* — Harness, Dickey & Pierce, P.L.C.; Stephen T. Olson

(57) ABSTRACT

The present invention is provided with an inflator arranged on the occupant side of the side frame positioned on the side portion inside the seatback that generates expansion gas and an airbag that is expanded by the expansion gas and protects an occupant seated on the vehicle seat. The airbag includes a main chamber that deploys toward the front of the seatback, and a pre-chamber that houses the inflator inside and is connected to the occupant side of the main chamber. In addition, an internal tether having a front end part connected to the front portion of the pre-chamber and a rear end part connected to the rear portion of the pre-chamber are provided inside the pre-chamber.

19 Claims, 13 Drawing Sheets

(51) Int. Cl.
 B60R 21/2338 (2011.01)
 B60R 21/233 (2006.01)

(52) U.S. Cl.
 CPC ............. *B60R 2021/23146* (2013.01); *B60R 2021/23324* (2013.01)

(56) References Cited

U.S. PATENT DOCUMENTS

| | | | |
|---|---|---|---|
| 11,518,339 B2* | 12/2022 | Kobayashi | B60R 21/233 |
| 2007/0228699 A1* | 10/2007 | Bederka | B60R 21/2346 |
| | | | 280/730.2 |
| 2011/0042926 A1 | 2/2011 | Mayer et al. | |
| 2014/0035264 A1 | 2/2014 | Fukushima et al. | |
| 2016/0114757 A1* | 4/2016 | Fujiwara | B60R 21/23138 |
| | | | 112/475.17 |

FOREIGN PATENT DOCUMENTS

| | | | | |
|---|---|---|---|---|
| JP | 2012-162136 A | 8/2012 | | |
| JP | 2014-031096 A | 2/2014 | | |
| JP | 2016-084048 A | 5/2016 | | |
| JP | 2019-131160 A | 8/2019 | | |
| JP | 2019-131165 A | 8/2019 | | |
| WO | WO-2017209192 A1 * | 12/2017 | ............... | B60N 2/42 |
| WO | WO-2018123427 A1 * | 7/2018 | ........... | B60R 21/207 |
| WO | 2019/244493 A1 | 12/2019 | | |

OTHER PUBLICATIONS

WO-2018123427-A1 Machine English Translation (Year: 2018).*
Office Action received in corresponding Chinese Patent Application 202180012507.7, dated Mar. 30, 2023 with translation.
Chinese Office Action regarding Patent Application No. 202180012507.7, dated Aug. 31, 2023.

* cited by examiner

A1-A1 cross section

Inside ↑
Front ←→ Back
Outside ↓

A1-A1 cross section

A1-A1 cross section

A1-A1 cross section

A1-A1 cross section

A1-A1 cross section

SIDE AIRBAG DEVICE

TECHNICAL FIELD

The present invention relates to a side airbag device equipped in a vehicle seat.

BACKGROUND ART

The provision of a vehicle with one or more airbags in order to protect the occupants thereof in the event of a vehicle accident is well known. These airbags include, for example, various forms such as: a so-called driver airbag which is deployed from near the center of the steering wheel so as to protect the driver; a curtain airbag which is deployed downward on the inner side of the window of an automobile so as to protect occupants during collisions in the transverse direction of a vehicle, as well as when overturning and during rollover accidents; and a side airbag which is deployed between the occupant and the side panel so as to protect the occupant upon impact in the transverse direction of a vehicle. The present invention relates to a side airbag device provided in a vehicle seat.

The side airbag device is stowed in the side support part of a seat, and thus the restriction in the installation region is large, and the compactness of the device is an important problem. Moreover, there is a demand for appropriate passenger protection performance due to improved deployment speed and stabilization of the deployed shape.

In recent years, side airbag devices have been proposed that combine a plurality of chambers to form an airbag. For example, there are systems with a pre-chamber with a relatively small capacity inside the main chamber (on the occupant side), as described in Patent Document 1.

In this manner of side airbag device, improving the initial restraint performance of the pre-chamber on the occupant is a problem.

There is also demand to reduce injury to occupants in so-called out-of-position (OOP) situations. For example, when a child leans his or her head on the side support part of the seat, impact is anticipated to be applied thereto from the airbag that deploys forward, particularly from the large-capacity main chamber. However, a conventional side airbag device can not be said to be sufficiently compatible with OOP.

PRIOR ART DOCUMENTS

Patent Documents

Patent Document 1: WO 2017/209192

SUMMARY OF THE INVENTION

Problem to be Solved by the Invention

In light of the conditions described above, an object of the present invention is to provide a side airbag device that contributes to improving initial restraint performance of the occupant.

Another object of the present invention is to provide a side airbag device capable of reducing the injury value to an OOP occupant.

Means to Solve the Problem

The following describes means for solving the problem described above and the effect thereof. In the present invention, when an occupant is seated in a seat in a regular posture, the direction the occupant faces (vehicle traveling direction) is referred to as the "front," the opposite direction is referred to as the "rear," and the direction indicating the coordinate axis is referred to as the "front-to-back direction." Moreover, when the passenger is seated in the seat in a regular posture, the right of the passenger is referred to as the "right direction," the left of the passenger is referred to as the "left direction," and the direction indicating the coordinate axis is referred to as the "left and right direction." Similarly, when the occupant is seated in the seat in a regular posture, the head direction (vertical up direction) of the occupant is referred to as "up," the waist direction (vertical down direction) of the passenger is referred to as "down," and the direction indicating the coordinate axis is referred to as the "vertical direction."

In order to achieve the purpose as described above the present invention is a side airbag device stowed in the seatback of a vehicle seat, comprising:

an inflator arranged on the occupant side of the side frame which is positioned on the side part inside the seatback, that generates expansion gas, and an airbag which expands due to said expansion gas and protects the occupant seated in the vehicle seat. The airbag includes a main chamber that deploys toward the front of the seatback, and a pre-chamber that houses the inflator inside and is connected to the occupant side of the main chamber. In addition, an internal tether having a front end part connected to the front portion of the pre-chamber and a rear end part connected to the rear portion of the pre-chamber are provided inside the pre-chamber.

Here, "main chamber that deploys towards the front of the seatback" is indicated but it goes without saying that while the main chamber deploys primarily toward the front, the bag expands so naturally there is expansion in the left and right width direction as well. In addition, "a pre-chamber connected to the occupant side of the main chamber" means that the pre-chamber is deployed between the main chamber and the occupant.

Note that in the present invention, the occupant is represented by a side impact dummy world SID (an adult male (175 cm in height and approximately 74 kg in weight) 50th percentile male side impact dummy).

In the present invention configured as described above, the internal tether extending in the front-rear direction is provided inside the pre-chamber. Therefore, when the airbag is deployed, broadening in the left and right width direction of the pre-chamber is restricted enabling ensuring sufficient width in the left-right direction of the pre-chamber. As a result, the pre-chamber quickly comes into contact with the occupant at the initial stage of airbag deployment, and movement of the occupant in the left-right direction can be reliably restrained. In addition, restriction of deployment of the pre-chamber toward the front by the internal tether also affects the main chamber, and the forward deployment of the main chamber is also restricted. Therefore, even in a so-called out-of-position (OOP) situation where the occupant is at the front of the side support portion of the seat, the injury value to the occupant can be reduced.

A front end part of the internal tether can be connected near a front edge of the pre-chamber.

The pre-chamber is configured with at least two panels including a first panel connected to the main chamber by a coupling part and a second panel provided on the occupant side, where the front edge of the pre-chamber is a sewn portion in the vehicle forward direction of the first panel and second panel, and this sewn portion is sewn together with the front end part of the internal tether.

A front end part of the internal tether can be connected near the center of the pre-chamber in the vertical direction. In this case, the forward deployment of the pre-chamber near the center is restricted, and the thickness in the left-right direction increases at that location enabling quickly restraining, for example, from the chest to the waist of the occupant.

The internal tether can be configured so as to extend diagonally upwards from the rear end part to the front end part with the front end part of this internal tether connected near the upper end of the pre-chamber. In this case, the forward deployment of the pre-chamber near the upper part is restricted, and the thickness in the left-right direction increases at that location enabling quickly restraining, for example, the shoulders of the occupant.

In addition, the internal tether can extend diagonally downwards from the rear end part to the front end part with the front end part of this internal tether connected near the lower end of the pre-chamber. In this case, the forward deployment of the pre-chamber near the lower part is restricted, and the thickness in the left-right direction increases at that location enabling quickly restraining, for example, the waist of the occupant.

A rear end part of the internal tether can be connected near a rear end of the pre-chamber.

A rear end part of the internal tether can be connected to the inflator.

The inflator is formed in a cylinder shape (columnar shape), and the rear end part of the internal tether can be connected so as to surround the periphery of the inflator.

A rectifying member for restricting the flow of the expansion gas can be arranged on the periphery of the inflator, and the rear end part of the internal tether can be arranged so as to surround the periphery of the rectifying member.

A rear end part of the internal tether connected to the inflator may be configured to function as a rectifying member that restricts flow of the expansion gas.

The width of the internal tether in the direction orthogonal to the longitudinal direction is smaller than the length of the inflator in the longitudinal direction.

The inflator can be configured so as to be secured to the side frame by a fastener and the rear end part of the internal tether can be fastened to the fastener of the inflator.

The length from the front end part to the rear end part of the internal tether is preferably shorter than the length of the pre-chamber before deployment in the extending direction of the internal tether. By setting the length of the internal tether shorter than the length of the corresponding portion of the pre-chamber in this manner, expansion of the pre-chamber can reliably be restricted in the front-rear direction.

The configuration can have the main chamber partitioned into a front chamber and a rear chamber and have the expansion gas pass from the pre-chamber through the rear chamber of the main chamber to reach the front chamber.

The configuration (resolution means) and action/effect of the present invention have been described above. The side airbag according to the present invention can be applied to the type that deploys to the door side (outside) of the seat or to the type that deploys to the side of the seat at the center of the vehicle. Note that a side airbag device of a type which is deployed on the vehicle center side of the seat, for example, is referred to as a far side airbag device, front center airbag, rear center airbag, and the like.

DESCRIPTION OF THE PREFERRED EMBODIMENTS

Figure 1:
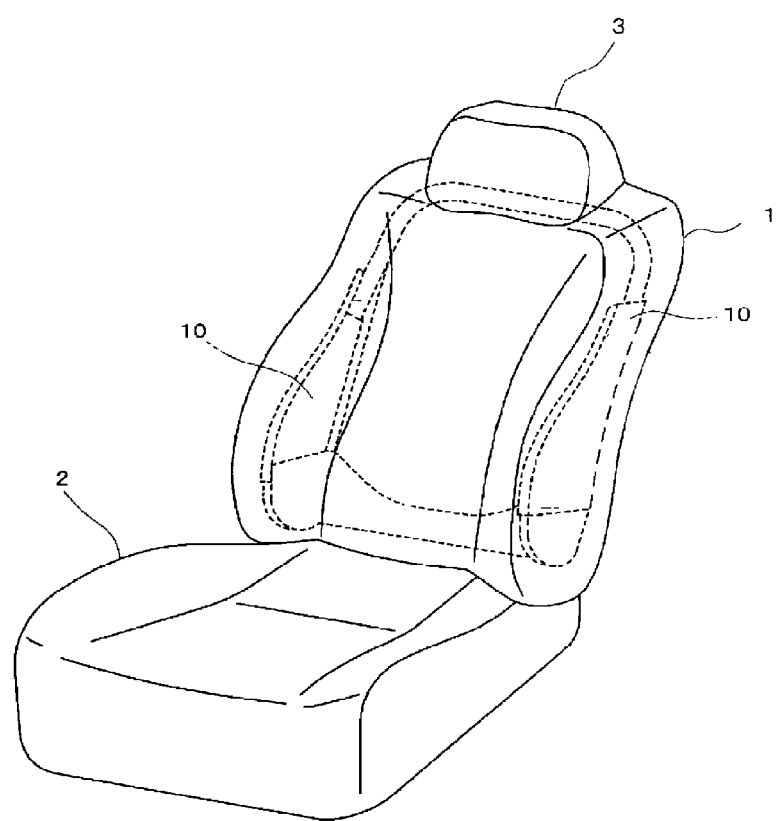
FIG. 1 is a perspective view illustrating mainly the external shape of a vehicle seat capable of having the side airbag device according to the present invention mounted therein, with illustration of the airbag device omitted.

A vehicle seat according to an embodiment of the present invention will be described with reference to accompanying drawings. Note that "front" indicated in the drawings indicates the front side (in the traveling direction) of a vehicle, "rear" indicates the rear of the vehicle (side opposite the traveling direction), "inside" indicates the inner side in the vehicle width direction (occupant side), and "outside" indicates the outer side in the vehicle width direction (door panel side).

Figure 2:
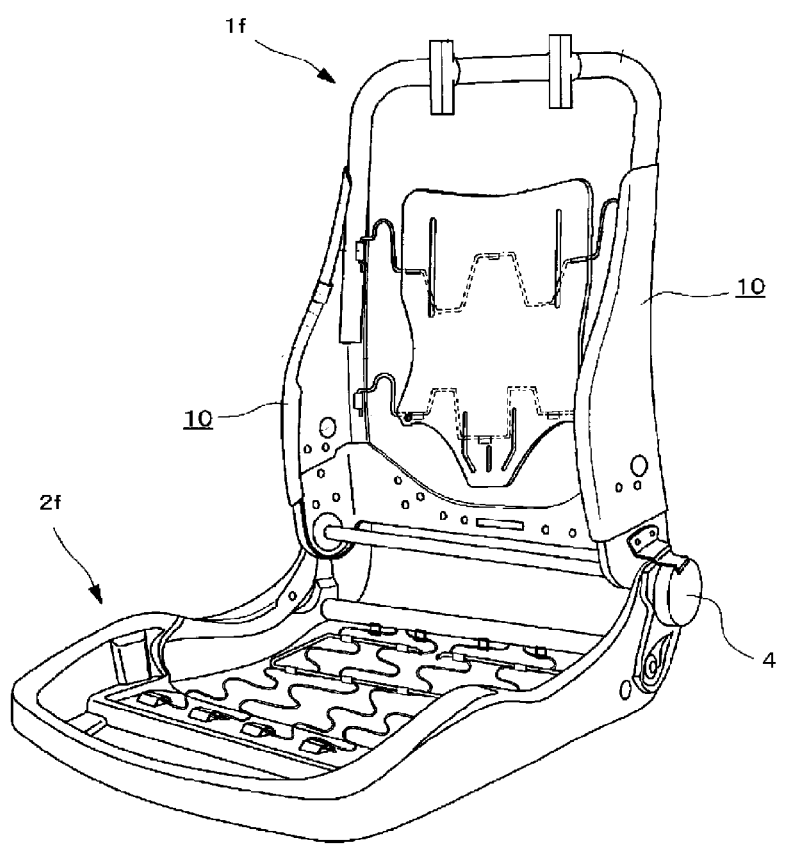
FIG. 2 is a perspective view illustrating an internal structure (seat frame) functioning as a framework of the vehicle seat illustrated in FIG. 1, with an illustration of the side airbag device omitted.
Figure 3:
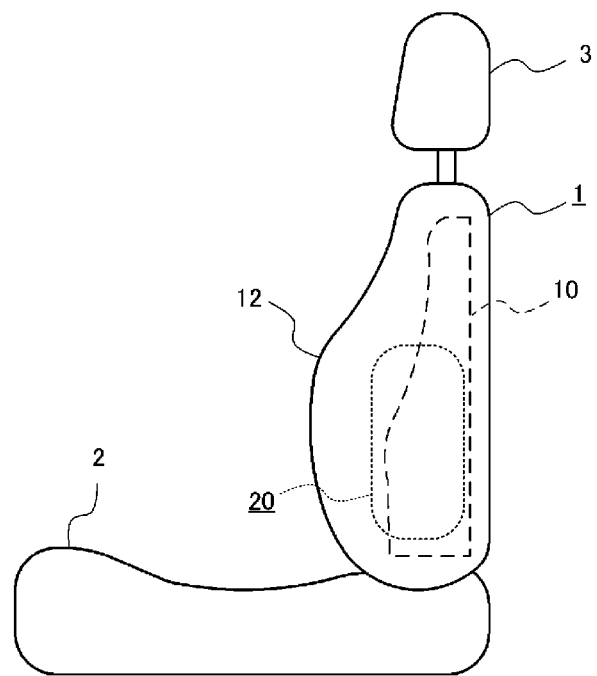
FIG. 3 is a schematic side surface view of the vehicle seat according to the present invention, illustrating a condition where the side airbag device is stored therein, observed (see through) from the outside in the vehicle width direction.
Figure 3:
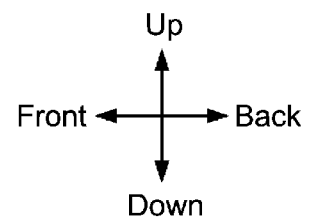

FIG. 1 is a perspective view illustrating mainly the external shape of a vehicle seat to which the side airbag device 20 according to the present invention can be applied, with illustration of the side airbag device (20) omitted. FIG. 2 is a perspective view illustrating an internal structure (seat frame) functioning as a framework of the vehicle seat illustrated in FIG. 1, with illustration of the side airbag device (20) omitted here as well. FIG. 3 is a schematic side surface view of the vehicle seat mounted with the side airbag device 20 according to the present invention, for example, illustrating a condition where the airbag device 20 is stowed on a side surface (near side) near a door as observed from the outside in the vehicle width direction.

As illustrated in FIG. 1 and FIG. 2, from the viewpoint of components, a vehicle seat to which a side airbag device 20 according to the present invention can be applied includes a seat cushion 2, or a portion for an occupant to sit on, a seatback 1 forming a backrest, and a headrest 3 connected to the upper end of the seatback 1.

A seatback frame 1f that forms that framework of the seat is provided in the inner portion of the seatback 1, a pad made of urethane foam or the like is provided on the surface and periphery thereof, and a surface skin (not illustrated) is provided. As for the seat cushion 2, similar to the seatback 1, a pad made of urethane foam or the like is provided on the upper surface and periphery of the seating frame 2f, and a surface skin (not illustrated) is provided. The seating frame 2f and the seatback frame 1f are connected via a reclining mechanism 4.

As illustrated in FIG. 2, the seat back frame 1f is configured into a frame shape by side frames 10 disposed laterally spaced apart and extending in the vertical direction, an upper frame connecting the upper ends of the side frames 10, and a lower frame connecting the lower ends thereof. The headrest 3 is configured by providing a cushioned component outside a headrest frame.

Embodiment 1

Figure 4:
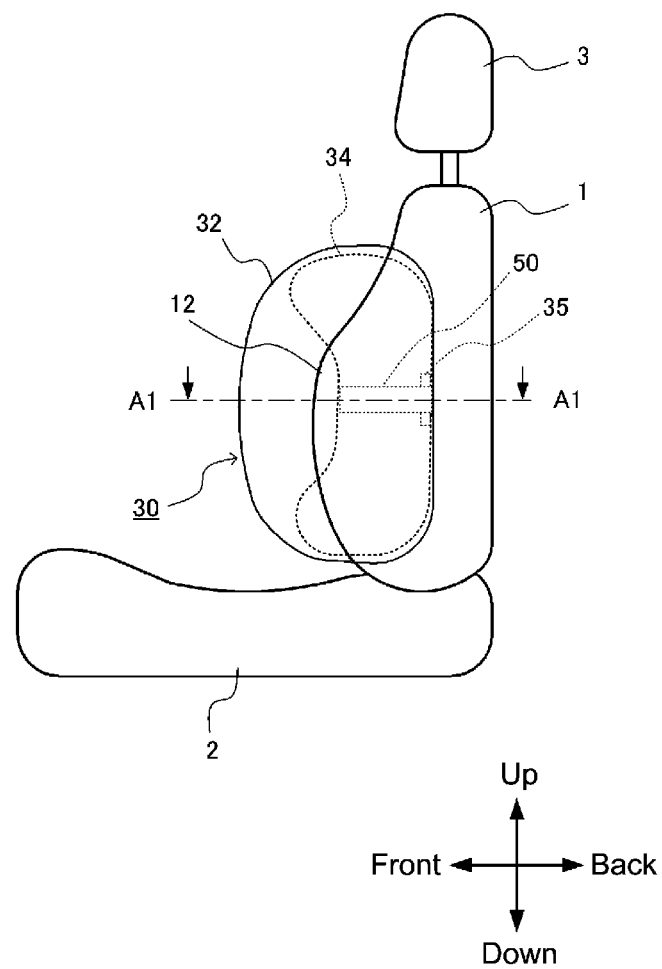
FIG. 4 is a schematic diagram (side view) illustrating the deployed state of the airbag according to Embodiment 1 of the present invention.
Figure 5A:
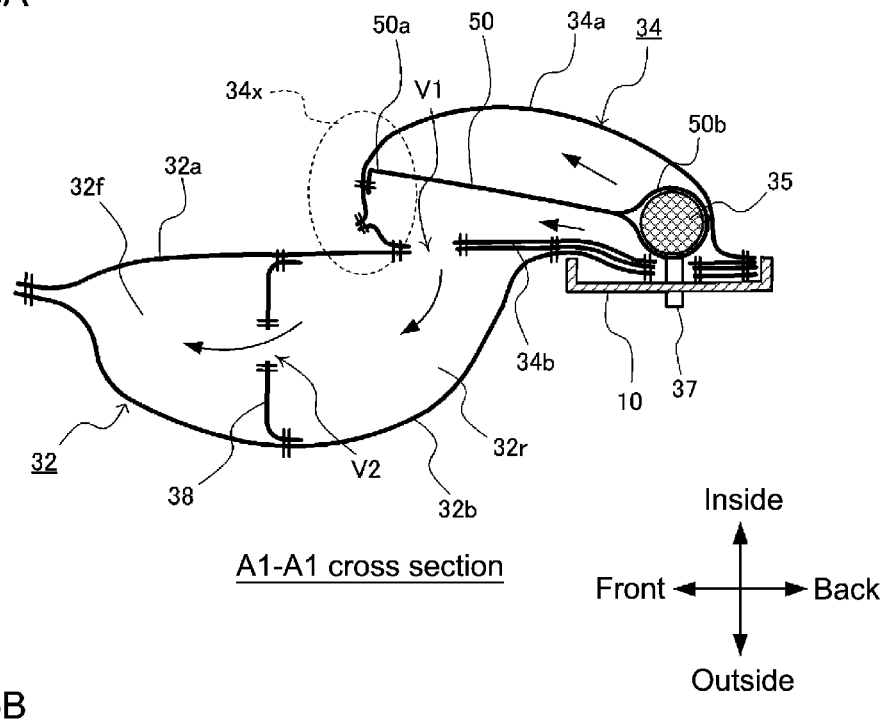
FIG. 5(A), (B) are schematic views illustrating the deployed state of an airbag according to Embodiment 1 of the present invention, corresponding to the cross section in the A1-A1 direction of FIG. 4.
Figure 6:
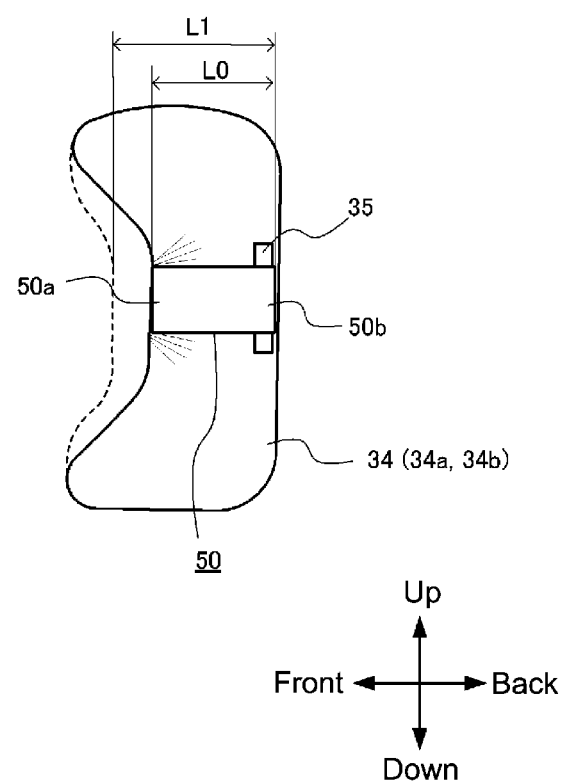
FIG. 6 is an explanatory diagram illustrating the relationship between the pre-chamber and the internal tether of the airbag according to Embodiment 1 of the present invention.

FIG. 4 is a schematic diagram (side view) illustrating the deployed state of the airbag 30 (32, 34) according to Embodiment 1 of the present invention. FIG. 5(A), (B) are schematic views illustrating the deployed state of the airbag 30, corresponding to the cross section in the A1-A1 direction in FIG. 4. FIG. 6 is an explanatory diagram illustrating the relationship between the pre-chamber 34 of the airbag 30 and the internal tether 50.

The airbag device according to Embodiment 1 of the present invention is arranged on the occupant side of the side frame 10 positioned on the side portion inside the seatback 1 and is provided with an inflator 35 that generates expansion gas and the airbag 30 that is expanded by the expansion gas and protects the occupant seated on the vehicle seat. The airbag 30 includes a main chamber 32 that deploys toward the front of the seatback 1, and a pre-chamber 34 that houses the inflator 35 inside and is connected to the occupant side of the main chamber 32. Furthermore, an internal tether 50 having a front end part 50a connected to the front portion of the pre-chamber 34 and a rear end part 50b connected to the rear portion of the pre-chamber 34 are provided inside the pre-chamber 34.

For example, a cylinder-type inflator having a cylindrical shape may be used as the inflator 35. Two stud bolts 37 protrude from the periphery of the inflator 35 toward the outside in the vehicle width direction. These stud bolts 37 are attached (fastened and secured) to the side frame 10 using nuts. The inflator 35 has a plurality of circumferentially aligned gas jets (not shown), and gas is radially emitted from these gas jets.

An airbag control ECU (not shown) mounted on the vehicle is electrically connected to this inflator 35. A satellite sensor (not shown) for detecting side collisions is electrically connected to this airbag control ECU. The inflator 35 can be configured to operate when the airbag control ECU detects a side collision based on a signal from this satellite sensor.

As illustrated in FIG. 5(A) and (B), the main chamber 32 includes the inner main panel 32a located on the passenger side and an outer main panel 32b located on the opposite side from the occupant. Furthermore, these two panels 32a and 32b are stacked and the outer edge parts are sewn together to form the main chamber 32.

The pre-chamber 34 is formed into a bag-like shape by, for example, overlapping two pre-chamber panels 34a and 34b of the same shape and sewing the periphery. A first panel 34b is connected to the inner main panel 32a by sewing at least around the inner vent V1. Note, as illustrated in FIG. 6, the pre-chamber panels 34a and 34b can be shaped such that the upper and lower portions of the front edge protrude forward.

As illustrated in FIG. 5(A) and (B), the inner main panel 32a has a first inner vent V1, and the expansion gas inside the pre-chamber 34 is supplied via the first inner vent V1 into the main chamber 32. Note, reinforcement sewing is formed around the inner vent V1.

Also, an opening for inserting the inflator 35 and openings to allow the stud bolts 37 of the inflator 35 to pass through are formed near the rear edge part of the outer main panel 32b.

As illustrated in FIG. 5(A), (B), a baffle panel 38 is provided on the inside of the main chamber 32 and connected to the inner surface of the inner main panel 32a. The baffle panel 38 allows the main chamber 32 to be divided into a forward main chamber 32f and a rear main chamber 32r.

A second inner vent V2 is formed in the buffer panel 38 and expansion gas flows from the rear main chamber 32r through this second inner vent V2 to the front main chamber 32f. Note, reinforcement sewing is formed around the inner vent V2.

The front end part 50a of the internal tether 50 is connected to the front edge of the pre-chamber 34, and the rear end part 50b is connected so as to surround the periphery of the inflator 35.

As illustrated in FIG. 6, a length L0 from the front end part 50a to the rear end part 50b of the internal tether 50 is set shorter than a length L1 of the pre-chamber 34 before deployment in the direction that the internal tether 50 extends. By setting the length of the internal tether 50 shorter than the length of the corresponding portion of the pre-chamber 34 in this manner, expansion of the pre-chamber 34 can reliably be restricted in the front-rear direction.

Figure 5B:
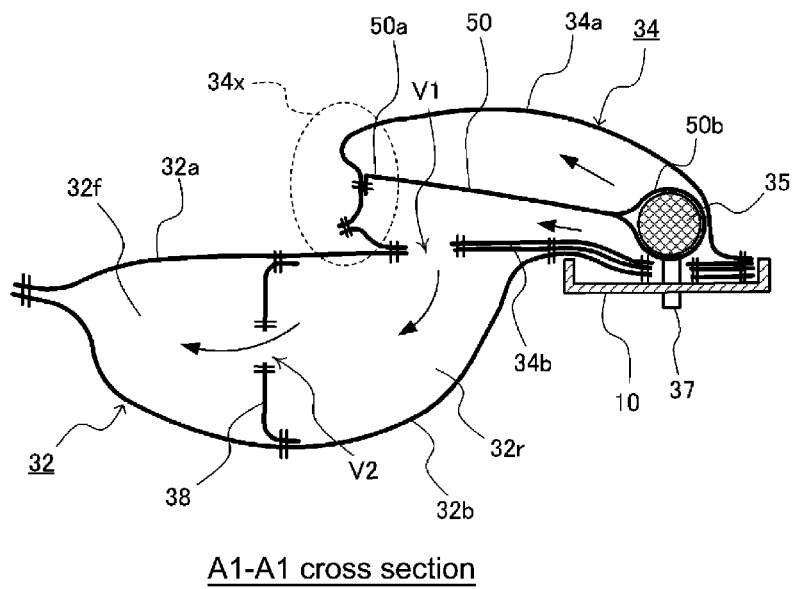

The deployment shape of a front portion 34x of the pre-chamber 34 differs between the aspect illustrated in FIG. 5(A) and the aspect illustrated in FIG. 5(B). In FIG. 5(A), the front end of the pre-chamber 34 in the fully deployed state and the front end part 50a of the internal tether 50 are relatively close to each other in the front-rear direction. On the other hand, in FIG. 5(B), with the front portion 34x of the pre-chamber 34 in a deployed state, the periphery of the sewn portion of the front end part 50a of the internal tether 50 is configured to protrude forward. In other words, the connecting portion between the internal tether 50 and the pre-chamber 34 is recessed. In this manner, as illustrated in FIG. 5(B), the shape of the front portion 34x of the pre-chamber 34 can be achieved by further shortening the length L0 of the internal tether 50 relative to the width (length) L1 in the front-to-back direction of the pre-chamber panel 34a that constitutes the pre-chamber 34.

Figure 7A:
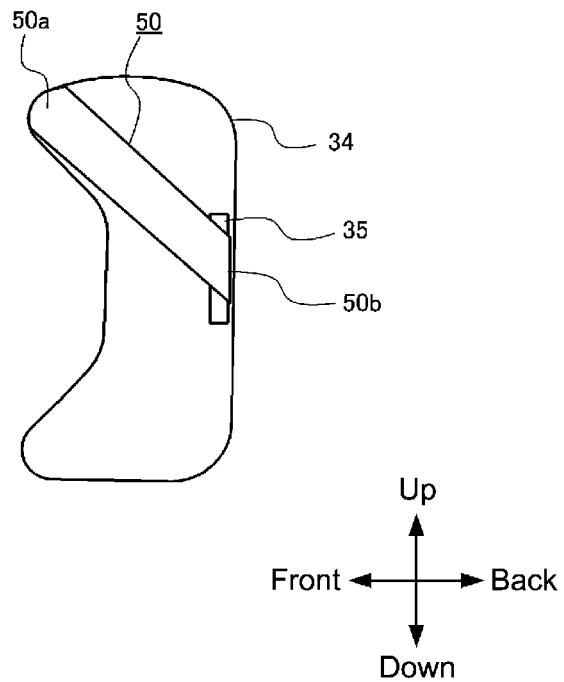
FIG. 7(A), (B) are explanatory diagrams illustrating an aspect of the positional relationship status between the pre-chamber and the internal tether of the airbag according to Embodiment 1 of the present invention.
Figure 7B:
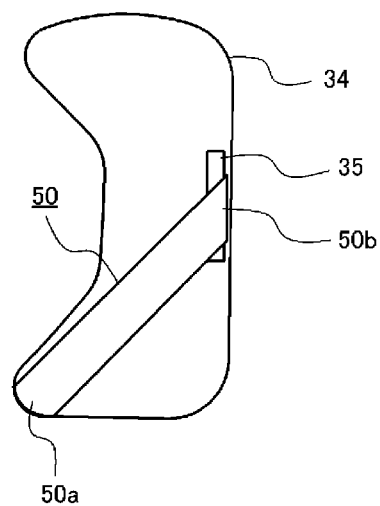
Figure 8A:
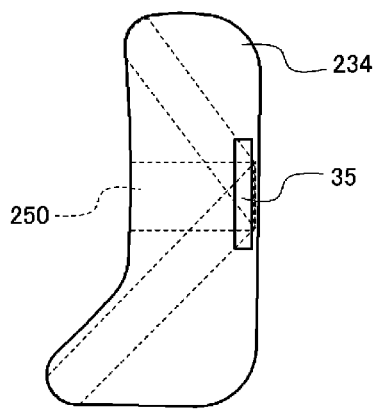
FIG. 8(A) to (C) are explanatory diagrams illustrating an aspect of the positional relationship status between the pre-chamber and the internal tether of the airbag according to Embodiment 1 of the present invention.
Figure 8B:
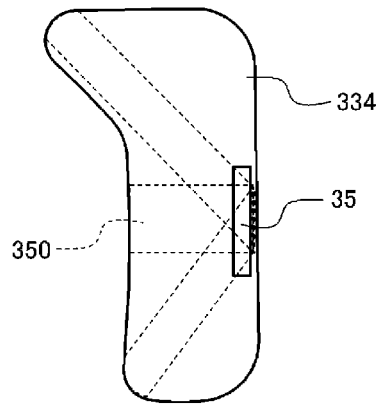
Figure 8C:
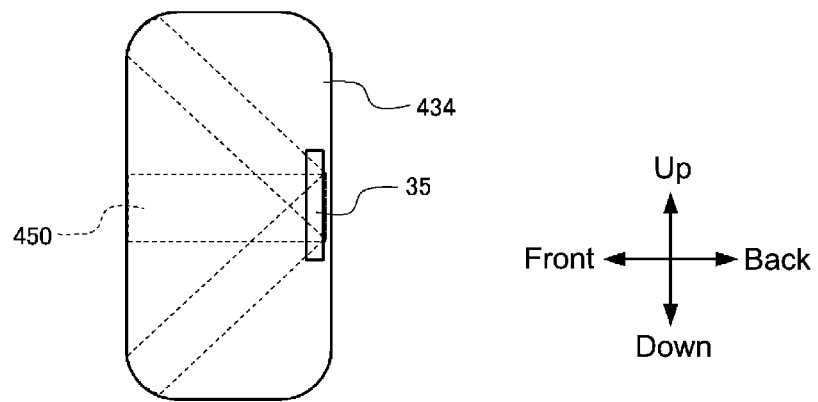

FIG. 7(A), (B) and FIG. 8(A) to (C) are explanatory diagrams illustrating an aspect of the positional relationship status between the pre-chamber 34 and the internal tether 50 of the airbag 30 according to Embodiment 1. In the aspect illustrated in FIG. 7(A), the front end part 50a of the internal tether 50 is connected to the upper end of the pre-chamber 34. In the aspect illustrated in FIG. 7(B), the front end part 50a of the internal tether 50 is connected to the lower end of the pre-chamber 34.

In the aspect illustrated in FIG. 8(A), the shape of a pre-chamber 234 is different from that of the pre-chamber 34 illustrated in FIG. 7, and only the lower end part protrudes forward. Furthermore, the front end part of an internal tether 250 can be connected near the center, upper end or lower end in the same manner as in FIG. 6 and FIG. 7(A) and (B).

In the aspect illustrated in FIG. 8(B), the shape of a pre-chamber 334 is different from that of the pre-chamber 34 illustrated in FIG. 7, and only the upper end part protrudes forward. Furthermore, the front end part of an internal tether 350 can be connected near the center, upper end or lower end in the same manner as in FIG. 6 and FIG. 7(A) and (B).

In the aspect illustrated in FIG. 8(C), the shape of a pre-chamber 434 is different from that of the pre-chamber 34 illustrated in FIG. 7 and when viewed from the side, the chamber is formed into a rounded rectangle or ellipse, and no forward projecting portion is formed. Furthermore, the front end part of an internal tether 450 can be connected near the center, upper end or lower end in the same manner as in FIG. 6 and FIG. 7(A) and (B).

In the present invention, when the front end part 50a of the internal tether 50 (250, 350, 450) is connected near the center of the pre-chamber 34 in the vertical direction, the thickness in the horizontal direction increases at that location, and, for example, the occupant can quickly be restrained from the abdomen to the chest.

On the other hand, if configured such that the internal tether 50 (250, 350, 450) extends diagonally upward from the rear end part 50b to the front end part 50a, and the front end 50a of the internal tether 50 (250, 350, 450) is connected near the upper end of the pre-chamber 34 (234, 334, 434), the thickness in the left-right direction increases at this location of the pre-chamber 34 (234, 334, 434), and, for example, the area near the shoulder of the occupant can quickly be restrained.

In addition, if configured such that the internal tether 50 (250, 350, 450) extends diagonally downward from the rear end part 50b to the front end part 50a, and the front end 50a of the internal tether 50 (250, 350, 450) is connected near the lower end of the pre-chamber 34 (234, 334, 434), the thickness in the left-right direction increases at this location of the pre-chamber 34 (234, 334, 434), and, for example, the area near the waist of the occupant can quickly be restrained.

Figure 9A:
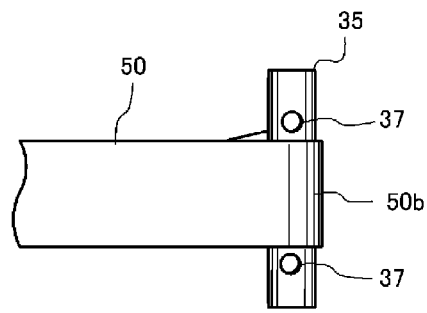
FIG. 9(A) to (C) are explanatory diagrams (side views) illustrating aspects of a connecting portion between an internal tether and an inflator used in the side airbag device according to Embodiment 1 of the present invention.
Figure 9B:
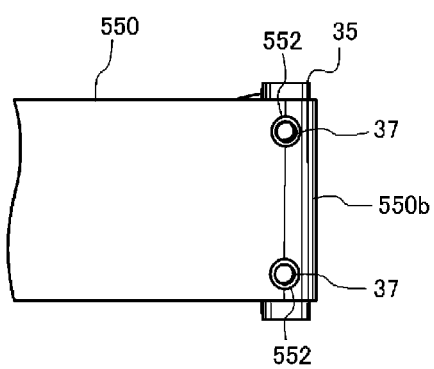
Figure 9C:
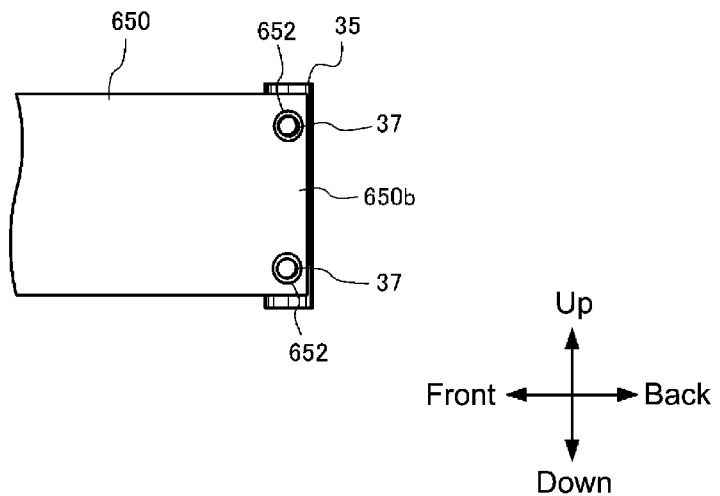

FIG. 9(A) to (C) are explanatory diagrams (side views) illustrating aspects of a connecting portion between the internal tether 50, 550, 650 and the inflator 35 used in the side airbag device 20 according to Embodiment 1 of the present invention.

The aspect illustrated in FIG. 9(A) corresponds to the structure illustrated in FIG. 5 and the rear end part 50b of the internal tether 50 is connected so as to surround the periphery of the inflator 35. The width of the internal tether 50 is set to be slightly narrower than the spacing between the two stud bolts 37 provided on the inflator 35.

Similar to the aspect of FIG. 9(A), in the aspect illustrated in FIG. 9(B), a rear end part 550b of the internal tether 550 is connected so as to surround the periphery of the inflator 35. The width of the internal tether 550 is set to be slightly narrower than the length of the inflator 35. Furthermore, holes 552 are provided in the rear end part 550b of the internal tether 550 for the two stud bolts 37 provided on the inflator 35 to penetrate through.

The aspect in FIG. 9(C) differs from FIG. 9(A) and (B) in that a rear end part 650b of the internal tether 650 is connected to the inflator 35 as a piece of cloth rather than in a bag shape. The width of the internal tether 650 is set to be slightly narrower than the length of the inflator 35. Furthermore, holes 652 are provided in the rear end part 650b of the internal tether 650 for the two stud bolts 37 provided on the inflator 35 to penetrate through.

Embodiment 2

Figure 10A:
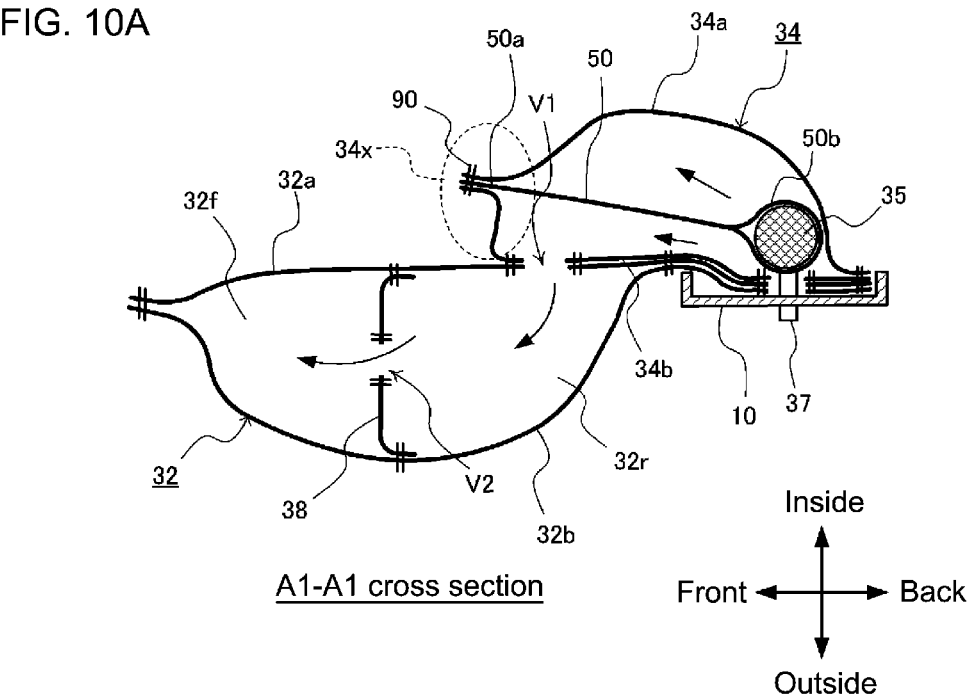
FIG. 10(A), (B) are schematic cross-sectional views illustrating the deployed state of an airbag according to Embodiment 2 of the present invention, corresponding to the cross section in the A1-A1 direction of FIG. 4.

FIG. 10(A), (B) are schematic cross-sectional views illustrating the deployed state of an airbag (30) according to Embodiment 2 of the present invention, corresponding to the cross section in the A1-A1 direction of FIG. 4. The present Embodiment has many structural elements in common with Embodiment 1 described above, and corresponding or identical structural elements are denoted by the same explanatory codes, and redundant descriptions are omitted.

The difference between the present Embodiment and Embodiment 1 lies in the method of securing the front end part 50a of the internal tether 50 arranged in the pre-chamber 34. In the present Embodiment, the front edges of two panels 34a and 34b that constitute the pre-chamber 34 are connected to each other by sewing 90, and the front end part 50a of the internal tether 50 is sewn together with the sewing 90. In other words, the front edges of the two panels 34a, 34b and the front end part 50a of the internal tether 50 are sewn together. Thus, the manufacturing process (sewing process) can be simplified.

Figure 10B:
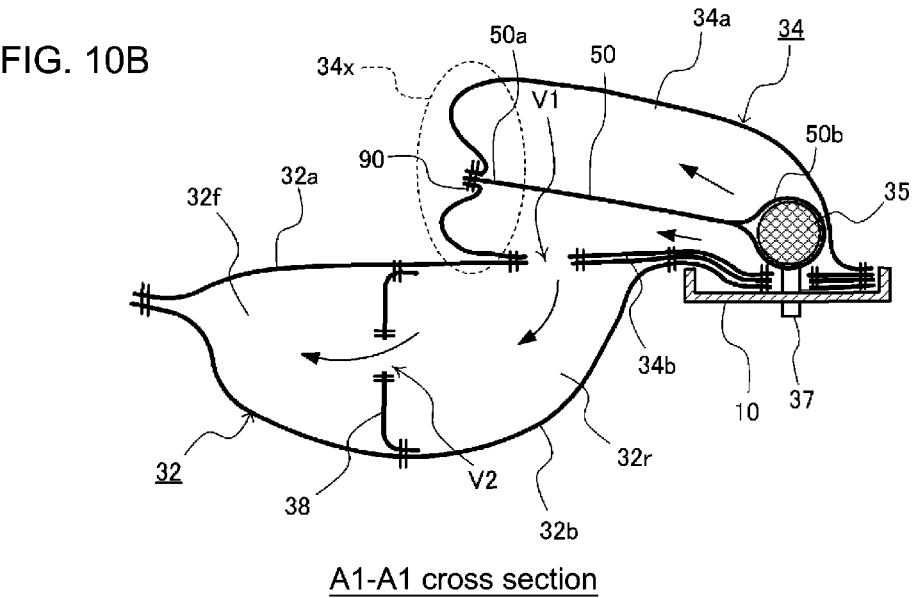

The deployment shape of a front portion 34x of the pre-chamber 34 differs between the aspect illustrated in FIG. 10(A) and the aspect illustrated in FIG. 10(B). In FIG. 10(B), with the front portion 34x of the pre-chamber 34 in a deployed state, the periphery of the sewn location of the front end part 50a of the internal tether 50 is configured to protrude forward. In other words, the connecting portion between the internal tether 50 and the pre-chamber 34 is recessed. In this manner, as illustrated in FIG. 10(B), the shape of the front portion 34x of the pre-chamber 34 can be achieved by further shortening the length L0 of the internal tether 50 relative to the width (length) L1 in the front-to-back direction of the pre-chamber panel 34a that constitutes the pre-chamber 34.

Note, in the present Embodiment, similar to Embodiment 1, it goes without saying that the variations illustrated in FIG. 7 to FIG. 9 can be applied.

Embodiment 3

Figure 11A:
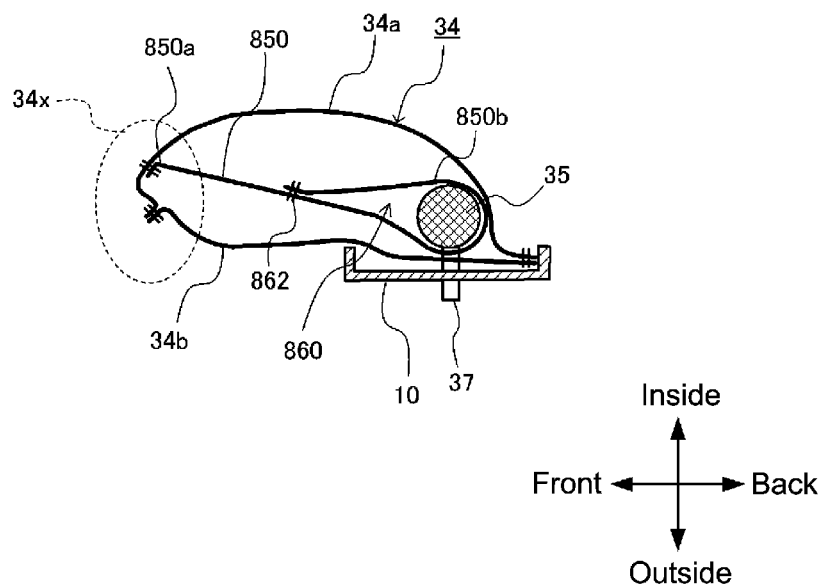
FIG. 11(A), (B) are cross-sectional views illustrating a part of the cross section (around the inflator) indicating the expanded state of the airbag according to Embodiment 3 of the present invention.

FIG. 11(A), (B) are cross-sectional views illustrating a part of the cross section (around the inflator) indicating the expanded state of the airbag according to Embodiment 3 of the present invention. In the present Embodiment, means (860, 970) for restricting gas flow are provided around the inflator 35.

In the aspect illustrated in FIG. 11(A), the rear end part 850b of the internal tether 850 surrounds the inflator 35, and a spacing 860 formed by the surrounding is used as the gas rectifying area. The size of the spacing 860 can be easily adjusted by changing the position of a sewing 862. The gas discharged from the inflator 35 is guided vertically (perpendicular to the paper surface) by the rectifying area (860).

Figure 11B:
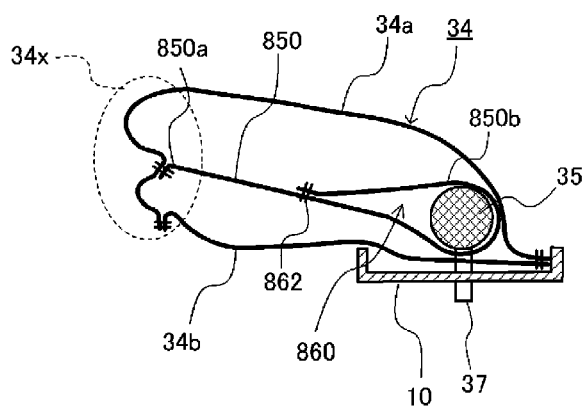

The deployment shape of the front portion 34x of the pre-chamber 34 differs between the aspect illustrated in FIG. 11(A) and the aspect illustrated in FIG. 11(B). In FIG. 11(A), the front end of the pre-chamber 34 in the fully deployed state and a front end part 850a of an internal tether 850 are relatively close to each other in the front-rear direction. On the other hand, in FIG. 11(B), with the front portion 34x of the pre-chamber 34 in a deployed state, the periphery of the sewn portion of the front end part 850a of the internal tether 850 is configured to protrude forward. In other words, the connecting portion between the internal tether 850 and the pre-chamber 34 is recessed. In this manner, as illustrated in FIG. 11(B), the shape of the front portion 34x of the pre-chamber 34 can be achieved by further shortening the length of the internal tether 850L0 relative to the width (length) L1 in the front-to-back direction of the pre-chamber panel 34a that constitutes the pre-chamber 34.

Embodiment 4

Figure 12A:
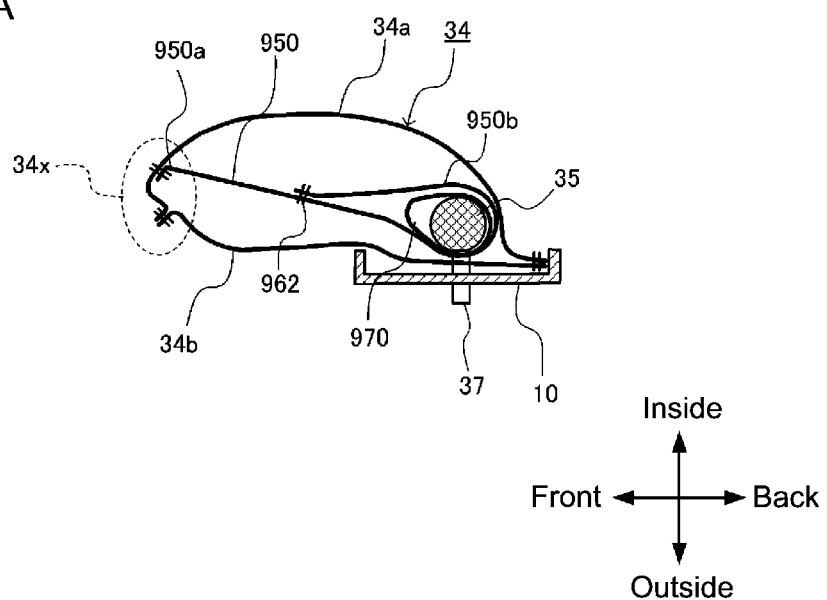
FIG. 12(A), (B) are cross-sectional views illustrating a part of the cross section (around the inflator) indicating the expanded state of the airbag according to Embodiment 4 of the present invention.

FIG. 12(A), (B) are cross-sectional views illustrating a part of the cross section (around the inflator) indicating the expanded state of the airbag according to Embodiment 4 of the present invention. In the present Embodiment, a cylindrical rectifying tube 970 is arranged around the inflator 35, and the outer periphery of the rectifying tube 970 is further surrounded by a rear end part 950b of an internal tether 950. Furthermore, the gas discharged from the inflator 35 is guided vertically (perpendicular to the paper surface) by the rectifying tube 970. As in Embodiment 3 illustrated in FIG. 12(A), (B), the rear end part 950b of the internal tether 950 can be used as a rectifying region, and the width (height) of the rectifying tube 970 can be reduced. In other words, the gas guided by the rectifying tube 970 can be further guided by the rear end part 950b of the internal tether 950.

Figure 12B:
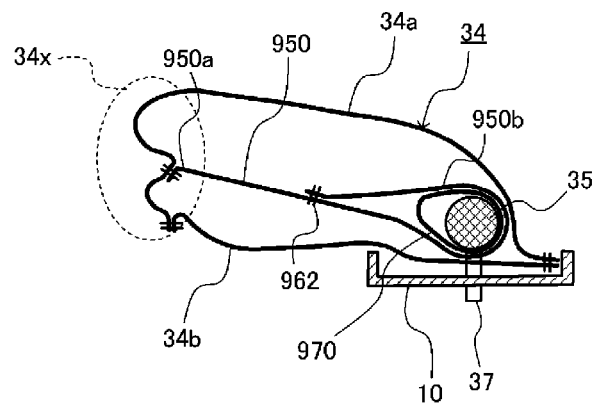

The deployment shape of the front portion 34x of the pre-chamber 34 differs between the aspect illustrated in FIG. 12(A) and the aspect illustrated in FIG. 12(B). In FIG. 12(A), the front end of the pre-chamber 34 in the fully deployed state and a front end part 950a of the internal tether 950 are relatively close to each other in the front-rear direction. On the other hand, in FIG. 12(B), with the front portion 34x of the pre-chamber 34 in a deployed state, the periphery of the sewn portion of the front end part 950a of the internal tether 950 is configured to protrude forward. In other words, the connecting portion between the internal tether 950 and the pre-chamber 34 is recessed. In this manner, as illustrated in FIG. 12(B), the shape of the front portion 34x of the pre-chamber 34 can be achieved by further shortening the length L0 of the internal tether 950 relative to the width (length) L1 in the front-to-back direction of the pre-chamber panel 34a that constitutes the pre-chamber 34.

Note that in the present Embodiment, similar to Embodiment 2 illustrated in FIG. 10, tip end parts 850a, 950a of the internal tethers 850, 850 can be sewn together at the front edges of the panels 34a, 34b.

Embodiment 5

Figure 13A:
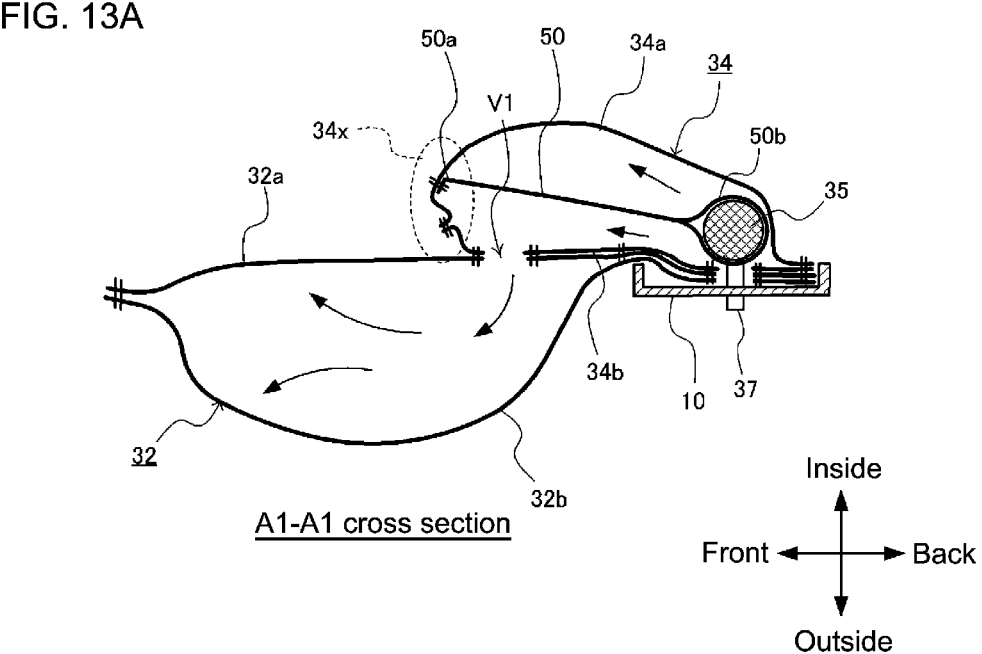
FIG. 13(A), (B) are schematic views illustrating the deployed state of an airbag according to Embodiment 5 of the present invention, corresponding to the cross section in the A1-A1 direction of FIG. 4.

FIG. 13(A), (B) are schematic views illustrating the deployed state of an airbag according to Embodiment 5 of the present invention, corresponding to the cross section in the A1-A1 direction of FIG. 4. The present Embodiment has substantially the same structure as Embodiment 1 illustrated in FIG. 5, but differs in that the main chamber 32 is not partitioned by a baffle panel (38). From the meaning of regulating the deployment shape of the pre-chamber 34, Embodiment 1 and Embodiment 3 of the present invention are the same. However, in the case of Embodiment 1 illustrated in FIG. 5, the main chamber 32 tends to expand in the lateral width direction. On the other hand, in the case of Embodiment 5 illustrated in FIG. 13, the main chamber 32 can easily be deployed forward.

Figure 13B:
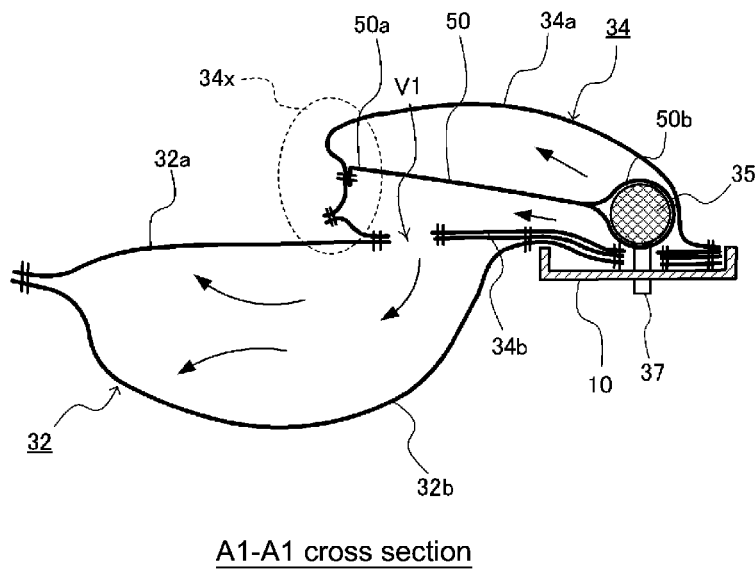

The deployment shape of the front portion 34x of the pre-chamber 34 differs between the aspect illustrated in FIG. 13(A) and the aspect illustrated in FIG. 13(B). In FIG. 13(A), the front end of the pre-chamber 34 in the fully deployed state and the front end part 50a of the internal tether 50 are relatively close to each other in the front-rear direction. On the other hand, in FIG. 13(B), with the front portion 34x of the pre-chamber 34 in a deployed state, the periphery of the sewn portion of the front end part 50a of the internal tether 50 is configured to protrude forward. In other words, the connecting portion between the internal tether 50 and the pre-chamber 34 is recessed. In this manner, as illustrated in FIG. 13(B), the shape of the front portion 34x of the pre-chamber 34 can be achieved by further shortening the length L0 of the internal tether 50 relative to the width (length) L1 in the front-to-back direction of the pre-chamber panel 34a that constitutes the pre-chamber 34.

Note that in the present Embodiment, similar to Embodiment 2 illustrated in FIG. 10, tip end parts 50a of the internal tethers 50 can be sewn together at the front edges of the panels 34a, 34b.

Effect

Embodiments of the present invention have been described and in the present invention configured as described above, the internal tether 50 extending in the front-rear direction is provided inside the pre-chamber 34. Therefore, when the airbag 30 is deployed, broadening in the left and right width direction of the pre-chamber 34 is restricted enabling ensuring sufficient width in the left-right direction of the pre-chamber 34. As a result, the pre-chamber 34 quickly comes into contact with the occupant at the initial stage of airbag 30 deployment, and movement of the occupant in the left-right direction can be reliably restrained. In addition, restriction of deployment of the pre-chamber 34 toward the front by the internal tether 50 also affects the main chamber 32, and the forward deployment of the main chamber 32 is also restricted. Therefore, even in a so-called out-of-position (OOP) situation where the occupant is at the front of the side support portion of the seat, the injury value to the occupant can be reduced.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative and not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device stowed in a seatback of a vehicle seat in combination with the vehicle seat, the side airbag device comprising:
an inflator arranged on an occupant side of a side frame positioned on a side portion inside the seatback that generates expansion gas; and
an airbag that is expandable by expansion gas for protecting an occupant seated on the vehicle seat,
wherein:
the airbag includes a main chamber that deploys toward a front of the seatback, and a pre-chamber that houses the inflator inside and is connected to the occupant side of the main chamber,
an internal tether having a front end part coupled to a front portion of the pre-chamber and a rear end part coupled to a rear portion of the pre-chamber is provided inside the pre-chamber,
the front portion of the pre-chamber and the front end part of the internal tether overlap the main chamber in an inside-outside direction upon expansion of the airbag; and
upon inflation of the airbag:
the pre-chamber is completely disposed on an inner side of the main chamber in the inside-outside direction,
an upper part and a lower part of the pre-chamber protrudes further forward than a center part of the pre-chamber upon inflation of the airbag,
the pre-chamber is disposed outside the main chamber and the pre-chamber and the main chamber are arranged in parallel with one another in a lateral direction as viewed from a top view, and
the main chamber protrudes further forward than the pre-chamber, in side view.

2. The side airbag device according to claim 1, wherein a front end part of the internal tether is coupled near a front edge of the pre-chamber and wherein the pre-chamber is configured with at least two panels including a first panel connected to the main chamber by a coupling part and a second panel provided on the occupant side, the front edge of the pre-chamber is a sewn portion in a vehicle forward direction of the first panel and second panel, and the sewn portion is sewn together with the front end part of the internal tether.

3. The side airbag device according to claim 1, wherein a front end part of the internal tether is coupled near a front edge of the pre-chamber and wherein the front end part of the internal tether is connected near a middle of the pre-chamber in a vertical direction.

4. The side airbag device according to claim 1, wherein a front end part of the internal tether is coupled near a front edge of the pre-chamber and wherein the internal tether extends from the rear end part of the internal tether diagonally downwards to the front end part and the front end part of the internal tether is connected near a lower end of the pre-chamber.

5. The side airbag device according to claim 1, wherein the rear end part of the internal tether is connected near a rear end of the pre-chamber.

6. The side airbag device according to claim 5, wherein:
the rear end part of the internal tether is connected to the inflator,
the inflator is molded in a cylinder shape and the rear end part of the internal tether is connected so as to encircle an outer periphery of the inflator, and
a rectifying member restricting flow of expansion gas is arranged on the outer periphery of the inflator and the rear end part of the internal tether is arranged so as to encircle the outer periphery of the rectifying member.

7. The side airbag device according to claim 6, wherein a width in a direction orthogonal to a longitudinal direction of the internal tether is smaller than a length in the longitudinal direction of the inflator.

8. The side airbag device according to claim 6, wherein the inflator has a structure secured to the side frame by a fastener and the rear end part of the internal tether is fastened to the fastener of the inflator.

9. The side airbag device according to claim 1, wherein a length of the internal tether from the front end part to the rear end part is shorter than a length of the pre-chamber in a direction that the internal tether extends.

10. The side airbag device according to claim 1, wherein the main chamber is partitioned into a front chamber and a rear chamber such that the expansion gas passes from the pre-chamber through the rear chamber of the main chamber to reach the front chamber.

11. The side airbag device according to claim 1, wherein the front end part of the internal tether is inwardly spaced from the main chamber upon expansion of the airbag.

12. The side airbag device according to claim 1, wherein the front end part of the internal tether is forwardly positioned relative to a rear end of the main chamber upon expansion of the airbag.

13. The side airbag according to claim 1, further comprising a vent hole between the main chamber and the pre-chamber for inflating the main chamber with expansion gas passing though the vent hole, the vent hole disposed proximate a forward end of the pre-chamber and proximate a rearward end of the main chamber.

14. The side airbag according to claim 1, wherein the airbag cushion has a maximum dimension in a front to back direction proximate an uppermost portion of the pre-chamber and proximate a lowermost portion of the pre-chamber.

15. The side airbag according to claim 14, wherein the airbag cushion has a minimum dimension in the front to back direction at a location equidistant from the uppermost portion and the lowermost portion.

16. A side airbag device stowed in a seatback of a vehicle seat in combination with the vehicle seat, the side airbag device comprising:
an inflator arranged on an occupant side of a side frame positioned on a side portion inside the seatback that generates expansion gas;
an airbag that is expandable by expansion gas for protecting an occupant seated on the vehicle seat, the airbag including a main chamber for deployment toward a front of the seatback, and a pre-chamber that houses the inflator inside and is connected to an occupant side of the main chamber; and
an internal tether inside the pre-chamber, the internal tether having a front end part coupled to a front portion of the pre-chamber and a rear end part coupled to a rear portion of the pre-chamber,
wherein the pre-chamber is laterally offset from the main chamber in a width direction,
wherein the main chamber is inflated with expansion gas limited to passing through a vent hole between the main chamber and the pre-chamber, and
wherein upon inflation of the airbag:
the pre-chamber is completely disposed on an inner side of the main chamber in the inside-outside direction, and an upper part and a lower part of the pre-chamber protruded further forward than a center part of the pre-chamber upon inflation of the airbag, the pre-chamber is disposed outside the main chamber and the pre-chamber and the main chamber are arranged in parallel with one another in a lateral direction as viewed from a top view, and the main chamber protrudes further forward than the pre-chamber, in side view.

17. The side airbag according to claim 16, further comprising a vent hole between the main chamber and the pre-chamber for inflating the main chamber with expansion gas passing though the vent hole, the vent hole disposed proximate a forward end of the pre-chamber and proximate a rearward end of the main chamber.

18. The side airbag according to claim 16, wherein the airbag cushion has a maximum dimension in a front to back direction proximate an uppermost portion of the pre-chamber and proximate a lowermost portion of the pre-chamber.

19. The side airbag according to claim 16, wherein the airbag cushion has a minimum dimension in the front to back direction at a location equidistant from the uppermost portion and the lowermost portion.

\* \* \* \* \*